(12) United States Patent
Leuterer

(10) Patent No.: US 8,525,071 B2
(45) Date of Patent: Sep. 3, 2013

(54) APPARATUS FOR MANUFACTURING A THREE-DIMENSIONAL OBJECT LAYER BY LAYER

(75) Inventor: Martin Leuterer, Olching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 996 days.

(21) Appl. No.: 12/459,583

(22) Filed: Jul. 1, 2009

(65) Prior Publication Data

US 2010/0012630 A1  Jan. 21, 2010

(30) Foreign Application Priority Data

Jul. 3, 2008 (DE) .................. 10 2008 031 587

(51) Int. Cl.
*B23K 26/00* (2006.01)
*B23K 26/12* (2006.01)

(52) U.S. Cl.
USPC ............................. 219/121.65; 219/121.86

(58) Field of Classification Search
USPC ............ 219/121.65, 121.66, 121.86, 121.85, 219/121.63, 121.64
See application file for complete search history.

(56) References Cited

U.S. PATENT DOCUMENTS

| | | | |
|---|---|---|---|
| 4,256,792 A * | 3/1981 | Koepke et al. | 428/119 |
| 4,756,976 A * | 7/1988 | Komeya et al. | 428/698 |
| 5,017,209 A * | 5/1991 | Yoshimura | 65/499 |
| 5,075,055 A * | 12/1991 | Finicle | 264/81 |
| 5,658,412 A | 8/1997 | Retallick et al. | |
| 5,753,274 A | 5/1998 | Wilkening et al. | |
| 5,876,767 A * | 3/1999 | Mattes et al. | 425/174.4 |
| 6,042,774 A | 3/2000 | Wilkening et al. | |
| 6,617,546 B2 | 9/2003 | Manetsberger et al. | |
| 7,153,463 B2 * | 12/2006 | Leuterer et al. | 264/308 |
| 7,229,272 B2 * | 6/2007 | Leuterer et al. | 425/375 |
| 2008/0066683 A1 * | 3/2008 | Fujimura et al. | 118/724 |
| 2008/0131104 A1 | 6/2008 | Philippi | |
| 2008/0138513 A1 | 6/2008 | Perret et al. | |
| 2008/0190905 A1 | 8/2008 | Heinlein | |
| 2010/0012630 A1 * | 1/2010 | Leuterer | 219/121.65 |

FOREIGN PATENT DOCUMENTS

| | | |
|---|---|---|
| DE | 43 00 478 | 8/1994 |
| DE | 101 08 612 | 6/2002 |
| DE | 296 24 498 | 9/2004 |
| WO | WO-2006/125507 | 11/2006 |
| WO | WO-2007/003244 | 1/2007 |
| WO | WO-2008/061732 | 5/2008 |

* cited by examiner

*Primary Examiner* — Sang Paik
(74) *Attorney, Agent, or Firm* — Edwards Wildman Palmer LLP; George W. Neuner

(57) ABSTRACT

An apparatus for manufacturing a three-dimensional object (3) by applying and solidifying a powdery constituent material (3a) layer by layer at positions corresponding to the respective cross sectional area of the object (3) in the respective layer by exposure to a laser (7) or another energy source comprises a heating or cooling element (22) supplying heat to or removing heat away from the constituent material (3a) applied layer by layer. For smoothing the temperature distribution, an intermediate layer (23) having a highly anisotropic heat conductivity is provided.

18 Claims, 3 Drawing Sheets

APPARATUS FOR MANUFACTURING A THREE-DIMENSIONAL OBJECT LAYER BY LAYER

The present invention relates to an apparatus for manufacturing a three-dimensional object layer by layer, especially to an apparatus for manufacturing a three-dimensional object by solidifying a constituent material layer by layer by supplying energy at positions corresponding to the cross sectional area of the object to be manufactured in the respective layer.

A method known by the name "Selective Laser Sintering" for manufacturing a three-dimensional object by subsequently solidifying layers of a powdery constituent material which can be solidified by means of electromagnetic radiation at positions corresponding to the respective cross sectional area of the object as well as an apparatus for carrying out this method is known from DE 43 00 478 C1. In the known apparatus, the object to be formed is built on a metallic platform which is a part of the apparatus.

In DE 296 24 498 U1 it is suggested to arrange a pre-manufactured plate, which can be removed together with the completed object situated thereon, on the platform. The platform comprises a cooling channel for accommodating a copper tube bearing cooling water.

Other documents also envisage a heating of the build-up chamber or the platform. DE 101 08 612 C1, for example, shows an apparatus for selective laser sintering in which the build-up chamber is enclosed by a mantle heating. Additionally, a bottom heating may be provided.

A problem arising when the platform, on which the three-dimensional object is built, is heated or cooled is the lacking homogeneity of the temperature distribution on the surface of the platform. If for example heat is supplied, local temperature peaks may occur having a negative effect to the quality of the powder layer and to the process behavior (e.g. melting, sintering, curl and warping).

The object of the present invention therefore is to provide an apparatus for manufacturing a three-dimensional object layer by layer, in which the quality of the powder layer and the process behavior are improved.

The object is attained by an apparatus according to claim 1. Further developments of the invention are indicated in the dependent claims.

Due to the intermediate layer having a highly anisotropic heat conductivity, the temperature distribution at the surface of the support is smoothed so that temperature peaks are avoided. By this means, the quality of the powder layer and the process behavior are improved. By an appropriate selection of the material used and of the thickness of the intermediate layer, the intensity of the effect can be purposefully affected.

Further features and advantages of the invention will appear from the description of an embodiment with reference to the enclosed figures.

In the following, an apparatus for manufacturing a three-dimensional object layer by layer according to a first embodiment of the present invention will be described with reference to FIGS. 1 and 2.

Figure 1:
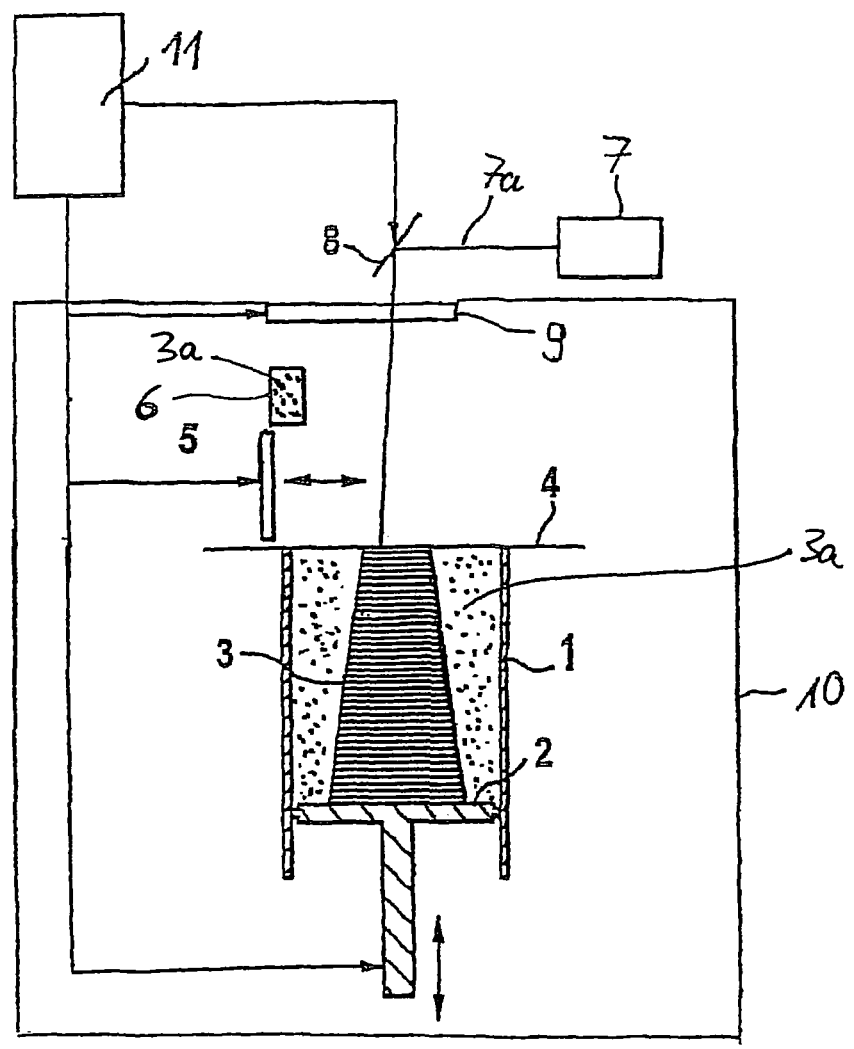
FIG. 1 is a schematic section view of an apparatus for manufacturing a three-dimensional object layer by layer.

The laser sintering apparatus shown in FIG. 1 includes container 1 which is open at the top and contains a support 2 moveable therein in a vertical direction, and supporting an object 3 to be formed and defining a build-up area. The support 2 is set in the vertical direction so that the respective layer to be solidified lies in a working plane formed by a surface of a working table 4 which has an opening at the position of the container 1. Further, an applicator 5 is provided for applying a powdery constituent material 3a which can be solidified by electromagnetic radiation. The constituent material 3a is supplied to the applicator 5 from a reservoir 6.

The apparatus further has a laser 7 generating a laser beam 7a which is directed by a deflection unit 8 to a coupling window 9, allowed to pass by this into the process chamber 10 and focused in a pre-determined point in the working plane 4.

Further, a control unit 11 is provided by which the components of the apparatus are controlled in a coordinated manner to perform the building process.

Figure 2:
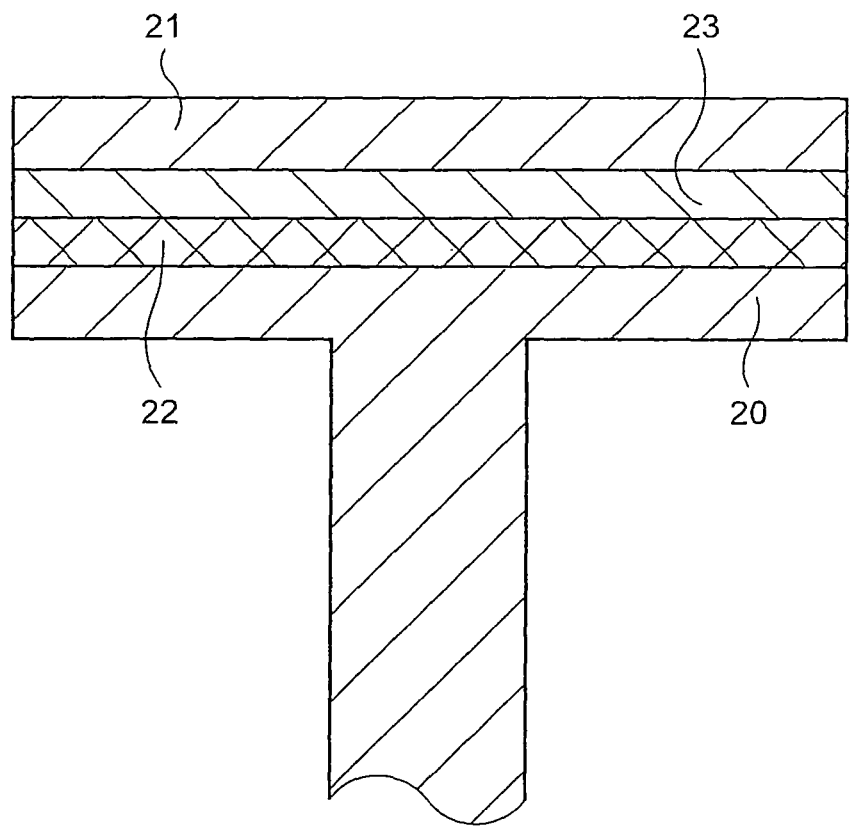
FIG. 2 is a schematic section view of a support included in the apparatus of FIG. 1 according to a first embodiment of the invention.
Figure 3:
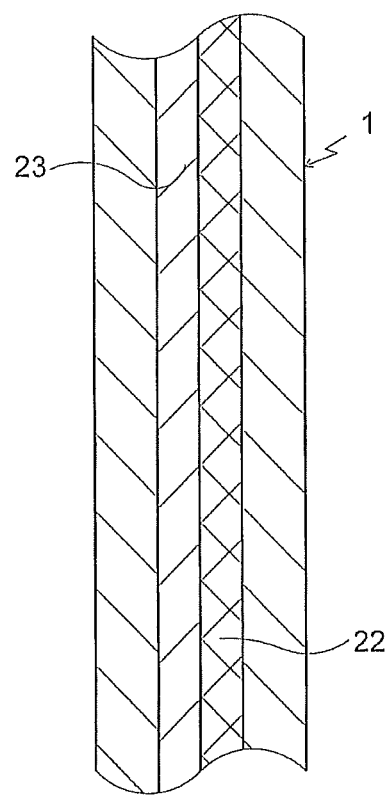
FIG. 3 is a schematic partial cross-section of a container wall 1.
Figure 4:
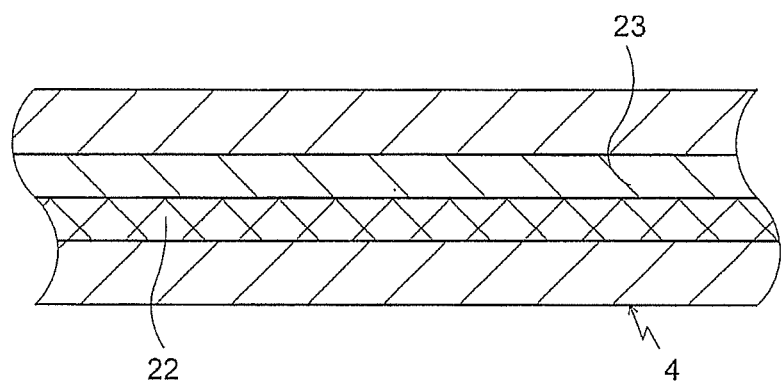
FIG. 4 is a schematic partial cross-section of a working table 4.

As can be seen best from FIG. 2, the support 2 has a support plate 20, preferably made from a metal, and a top plate 21, also preferably made from a metal. Between the support plate 20 and the top plate 21, a heating element 22 is arranged. Between the hating element 22 and the top plate 21, an intermediate layer 23 such as a foil or plate is arranged which is made from a material having a highly anisotropic heat conductivity.

Therein, the material having the highly anisotropic heat conductivity is arranged in a manner that the heat conductivity in a direction parallel to the surface of the support 2 (in the direction of the layer) is considerably higher than in a direction perpendicular to the surface of the support 2 (perpendicular to the direction of the layer). The intermediate layer 23 may for example be a graphite foil or a graphite plate with a multi-layer foil structure, e.g. a graphite laminate plate.

Preferably, the heat conductivity of the material at room temperature is at least 5 times as high in the direction of the layer as in the direction perpendicular to the layer, further preferably at least 10 times as high, and still further preferably at least 20 times as high.

When the apparatus is operated, the support 2 is moved in a first step until its top face lies by the thickness of a layer below the working area 4. By means of the applicator 5, a first layer of the material 3a is then applied to the support 2 and smoothed. Thereafter, the control unit 11 controls the deflection unit 8 in a manner that the deflected laser beam 7a selectively hits the positions of the layer of the material 3a which are to be solidified. Thereby, the material is solidified or sintered at these positions.

In a next step, the support 2 is lowered by the thickness of the next layer, and again, a second material layer is applied and smoothed using the applicator 5 and selectively solidified using the laser beam 7a. The steps of applying, smoothing and solidifying a material layer are performed repeatedly until the object 3 to be formed is completed.

The smoothing of the temperature distribution on the top surface of the support caused by the intermediate layer having the highly anisotropic heat conductivity is especially advantageous when plastics are used as constituent material. By the intermediate layer according to the invention, locally increasing temperatures which might cause a melting of the constituent material are avoided.

The intermediate layer having the highly anisotropic heat conductivity can also be used if a metal powder is used. The invention is generally applicable for manufacturing a three-dimensional object by solidifying a constituent material layer by layer, when a homogenous temperature distribution is advantageous.

In a second embodiment, the wall of the container instead of the support is provided with a heating element in order to supply heat from the side to the constituent material.

Also in this embodiment, an intermediate layer having a highly anisotropic heat conductivity is arranged at or in the container wall so that the heat conductivity in the direction of the layer (i.e. in parallel to the surface of the container wall) is considerably higher than in a direction perpendicular to the direction of the layer (i.e. perpendicular to the surface of the container wall).

Different from the first embodiment, the intermediate layer having a highly anisotropic heat conductivity is not arranged between the heating element and the constituent material, but on the side of the heating element facing away from the constituent material. Since discretely arranged heating elements are generally used for heating the container wall, a good temperature equalization in the area between the heating elements can be achieved also in this way. On the other hand, arranging the intermediate layer having the highly anisotropic heat conductivity on the side of the heating element facing away from the constituent material has the advantage of an improved insulation towards the outside.

The features of this embodiment may be combined or exchanged with those of the first embodiment. For example, both the support 2 and the wall of the container 1 might be provided each with a heating element and a layer having the highly anisotropic heat conductivity. At the support 2 and at the wall of the container 1, the layer having the highly anisotropic heat conductivity may be arranged between the heating element and the constituent material or on the side of the heating element facing away from the constituent material, respectively.

The invention is not restricted to the described embodiments. Instead of a heating element, for example a cooling element may be provided.

The heating or cooling element and the intermediate layer having the highly anisotropic heat conductivity may be arranged at any position of the support or the container wall.

The intermediate layer having the highly anisotropic heat conductivity may be fixedly or removably attached to the support or the container wall, or the support or the container wall themselves may be formed by a material having a highly anisotropic heat conductivity The intermediate layer having the highly anisotropic heat conductivity may be arranged across the entire cross section of the support or selectively at specific positions of the support, for example between a heating element and the border region of the support. Thus, heat supply to this region which otherwise would be undersupplied can be improved.

The intermediate layer having the highly anisotropic heat conductivity may also be part of a removably attached prefabricated plate which is laid upon the support and on which the object is to be formed.

Also at the container wall, the intermediate layer having the highly anisotropic heat conductivity may be arranged across the entire surface of the wall or only selectively at specific positions of the container wall.

The position at which the heating or cooling element and the intermediate layer having the highly anisotropic heat conductivity are arranged is not restricted to the examples described in the above embodiments. For example, also the working table 4 may be provided with them across its entire surface or a part thereof.

In all these cases, the material having the highly anisotropic heat conductivity is selected and arranged, as described above in the embodiments, so that the heat conductivity in the direction of the layer (i.e. in parallel to the surface of the support or of the container wall) is considerably higher than in a direction perpendicular to the direction of the layer (i.e. perpendicular to the surface of the support or of the container wall).

The invention claimed is:

1. An apparatus for manufacturing a three-dimensional object by applying and solidifying a powdery constituent material layer by layer at positions corresponding to the cross sectional area of the object in the respective layer by exposure to a laser or another energy source, the apparatus comprising:
   a support supporting layers of the powdery constituent material applied onto it for forming the object,
   a container having a wall which laterally delimits the build-up material,
   a heating or cooling element supplying heat to or removing heat away from the constituent material applied layer by layer, and
   an intermediate layer having a highly anisotropic heat conductivity, which is provided on the support and/or the wall of the container,
   wherein the intermediate layer having a highly anisotropic heat conductivity is a graphite plate with a multi-layer foil structure, and
   the heat conductivity of the intermediate layer at room temperature in a first direction, which is a direction parallel to the layer, is at least 5 times as high as that in a second direction, which is a direction perpendicular to the layer.

2. The apparatus according to claim 1, in which the intermediate layer having the highly anisotropic heat conductivity is arranged between the heating or cooling element and the constituent material.

3. The apparatus according to claim 1, in which the intermediate layer having the highly anisotropic heat conductivity is arranged on the side of the heating or cooling element facing away from the constituent material.

4. The apparatus according to claim 1,
   wherein the heating or cooling element and the intermediate layer having the highly anisotropic heat conductivity are arranged at the support.

5. The apparatus according to claim 1, further comprising a container having a wall, wherein the heating or cooling element and the intermediate layer having the highly anisotropic heat conductivity are arranged at the wall of a container delimiting the constituent material on the side.

6. The apparatus according to claim 1, further comprising a working table forming a working plane for applying and solidifying the constituent material, wherein the heating or cooling element and the intermediate layer having the highly anisotropic heat conductivity are arranged at a working table.

7. The apparatus according to claim 6, wherein
   the working table has a surface forming a working plane for applying and solidifying the constituent material, and
   the intermediate layer extends over the entire wall surface of the working table.

8. The apparatus according to claim 6, wherein
   the working table has a surface forming a working plane for applying and solidifying the constituent material, and
   the intermediate layer extends only over a part of the wall surface of the working table.

9. The apparatus according to claim 6, wherein the intermediate layer is a part of the working table.

10. The apparatus according to claim 1, in which the heat conductivity of the intermediate layer at room temperature in the first direction of the layer is at least 10 times as high as that in the second direction perpendicular to the layer.

11. The apparatus according to claim 1, in which the heat conductivity of the intermediate layer at room temperature in a first direction of the layer is at least 20 times as high as that in a second direction perpendicular to the layer.

12. The apparatus according to claim 1, wherein
the support has a cross section onto which layers of the powdery constituent material can be applied for forming the object, and
the intermediate layer extends over the entire cross section of the support.

13. The apparatus according to claim 1, wherein
the support has a cross section onto which layers of the powdery constituent material can be applied for forming the object, and
the intermediate layer only extends over a part of the cross section of the support.

14. The apparatus according to claim 1, wherein the intermediate layer is part of the support.

15. The apparatus according to claim 1, further comprising a plate which is laid upon the support and on which the object shall be formed, wherein the intermediate layer is part of the plate.

16. The apparatus according to claim 1, wherein
the container has a wall surface, and
the intermediate layer extends over the entire wall surface of the container.

17. The apparatus according to claim 1, wherein
the container has a wall surface, and
the intermediate layer extends only over a part of the wall surface of the container.

18. The apparatus according to claim 1, wherein
the container has a wall, and
the intermediate layer is a part of the wall of the container.

* * * * *